(12) United States Patent
Dover

(10) Patent No.: US 7,284,620 B1
(45) Date of Patent: Oct. 23, 2007

(54) DETACHABLE SIDE MOUNT HITCH SYSTEM FOR AN AGRICULTURAL IMPLEMENT

(75) Inventor: Gary H. Dover, Bucyrus, KS (US)

(73) Assignee: Bucyrus Equipment Co. Inc, Hillsdale, KS (US)

( * ) Notice: Subject to any disclaimer, the term of this patent is extended or adjusted under 35 U.S.C. 154(b) by 95 days.

(21) Appl. No.: 10/862,272

(22) Filed: Jun. 7, 2004

(51) Int. Cl.
*A01B 51/00* (2006.01)
(52) U.S. Cl. ........................ 172/272; 172/248
(58) Field of Classification Search ............... 172/452, 172/677, 679, 680, 605, 272, 248; 280/186
See application file for complete search history.

(56) References Cited

U.S. PATENT DOCUMENTS

| | | | |
|---|---|---|---|
| 2,221,549 A * | 11/1940 | Lindgren et al. | 172/307 |
| 2,239,332 A * | 4/1941 | Mee | 172/273 |
| 2,334,415 A * | 11/1943 | Koeller | 280/413 |
| 2,368,168 A * | 1/1945 | Smith et al. | 172/307 |
| 2,413,355 A * | 12/1946 | Johnson | 180/209 |
| 2,749,995 A * | 6/1956 | Klemm et al. | 180/14.1 |
| 2,768,838 A * | 10/1956 | Kramer | 280/472 |
| 2,788,728 A * | 4/1957 | Gray | 172/273 |
| 2,826,430 A * | 3/1958 | Nelson | 172/273 |
| 2,827,746 A * | 3/1958 | Bouilliant-Linet | 56/15.2 |
| 2,976,058 A * | 3/1961 | Sandgren | 280/413 |
| 4,204,699 A * | 5/1980 | Gustafson | 172/248 |
| 4,832,130 A | 5/1989 | Brouwer et al. | |
| 4,919,215 A * | 4/1990 | Lee et al. | 172/450 |
| 5,031,343 A * | 7/1991 | Houle et al. | 37/231 |
| RE34,080 E * | 9/1992 | Schmidt | 172/5 |
| RE34,827 E | 1/1995 | Dover et al. | |
| 5,626,195 A | 5/1997 | Dover | |
| 6,431,288 B1 * | 8/2002 | Hoffart | 172/439 |

OTHER PUBLICATIONS

Advertising materials of Trebro Manufacturing showing Harvestack Automatic Stacking Harvester believed to have been on sale for more than one year prior to the filing date of the present application.
Advertising materials of Chuck Shiels Manufacturing showing Maverick sod harvester believed to have been on sale for more than one year prior to the filing date of the present application.

(Continued)

*Primary Examiner*—Thomas B. Will
*Assistant Examiner*—Jamie L McGowan
(74) *Attorney, Agent, or Firm*—Erickson & Kleypas, L.L.C.

(57) ABSTRACT

A hitch system for attaching an agricultural implement to a towing vehicle, includes a side mount hitch having a pair of longitudinally spaced and upwardly oriented hitch balls connected to a side of the towing vehicle and a pair of longitudinally spaced hitch arms pivotally connected to an adjacent side of the implement. Each hitch arm carries a hitch coupler adapted to engage a respective one of the hitch balls proximate its distal end. The hitch arms are moveable between a raised transport position and a lowered working position wherein the couplers engage the hitch balls. The hitch system may also include a towing hitch for connecting the implement behind the towing vehicle during transport.

25 Claims, 5 Drawing Sheets

OTHER PUBLICATIONS

Advertisement of Brouwer Turf Equipment Limited published on p. 58 of the Jul./Aug. 1998 issue of Turf News showing the RollMax 2400 sod harvester.

Advertisement of Texas Sod Harvesting Equipmen,t Inc. published on p. 89 of the Jul./Aug. 1998 issue of Turf News showing the TSH 2001 and TSH 2010 sod harvesters.

Printout from website www.liveauctioneers.com showing John Deere Model 660 Hay Rake with Dolly Wheel believed to have been in public use for more than one year prior to the filing date of the present application.

* cited by examiner

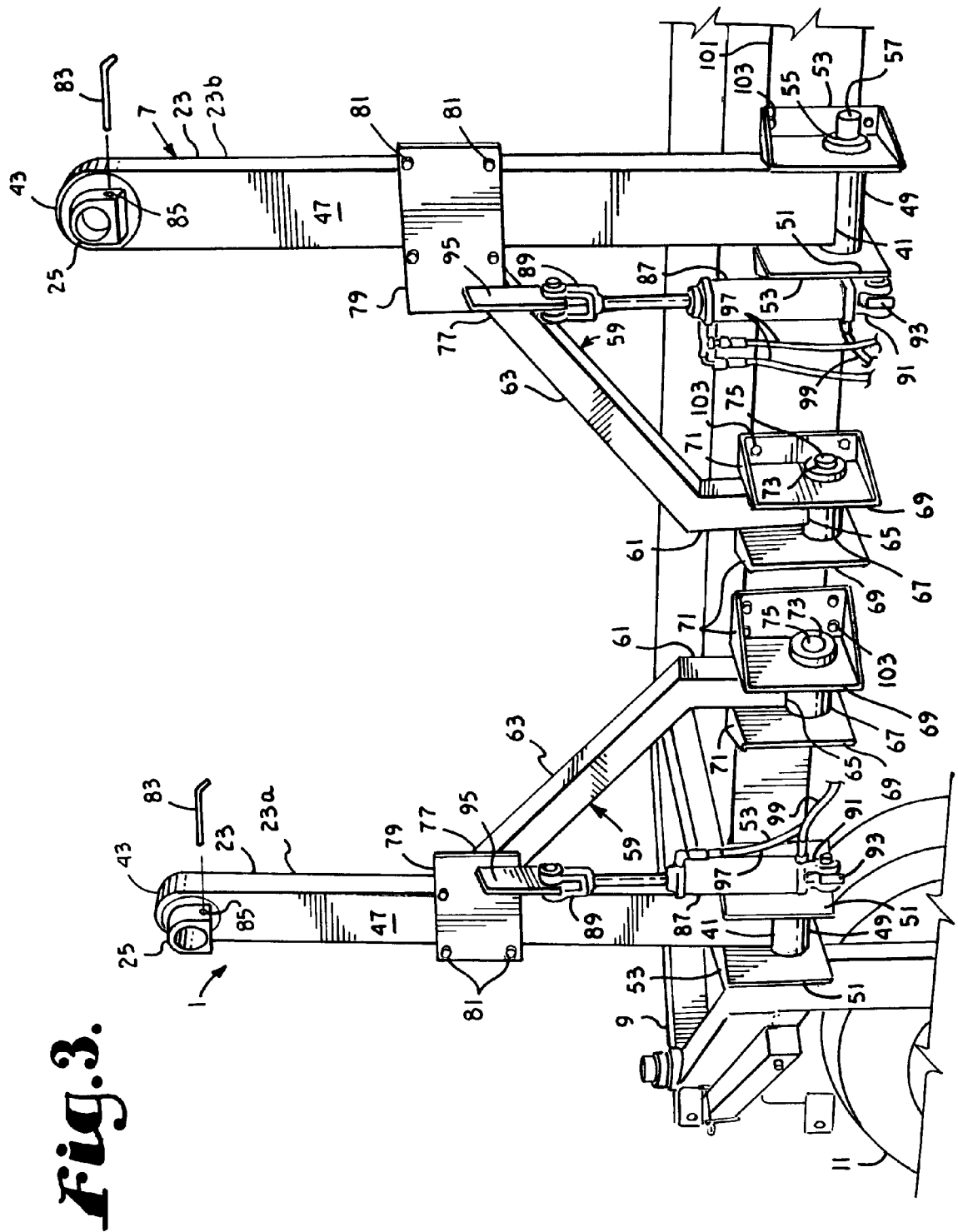

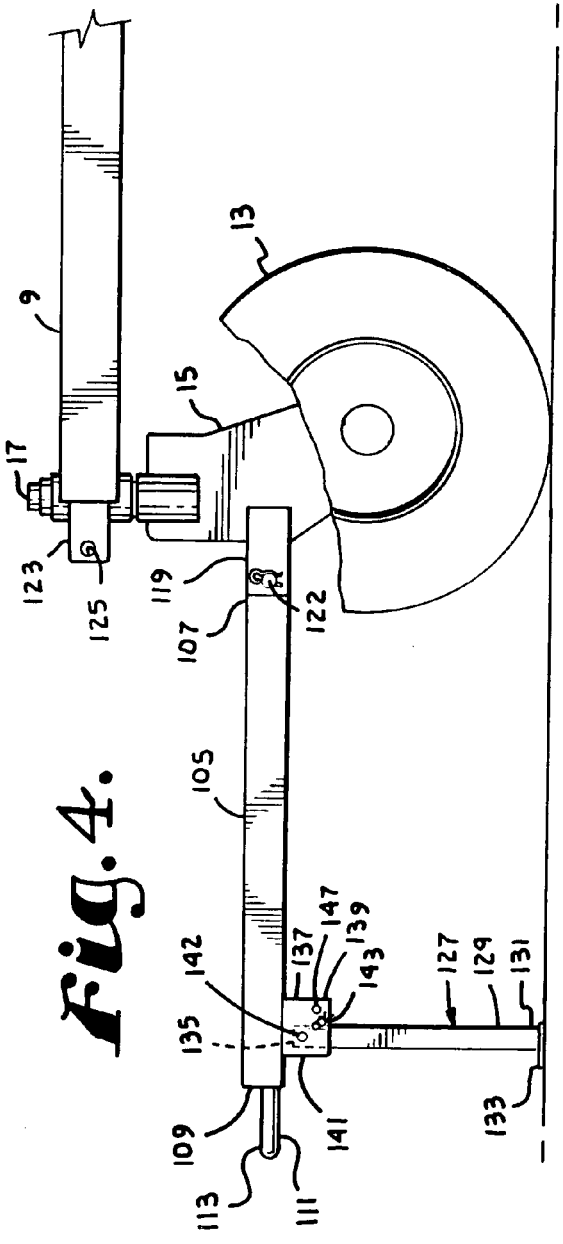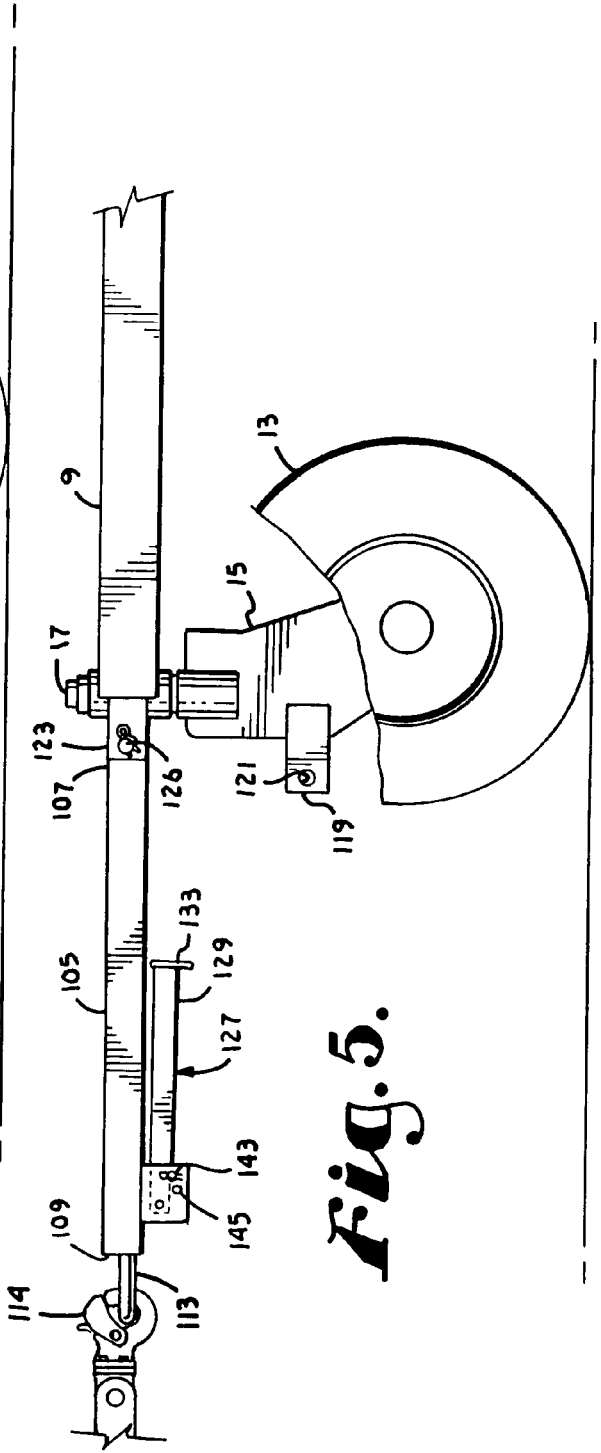

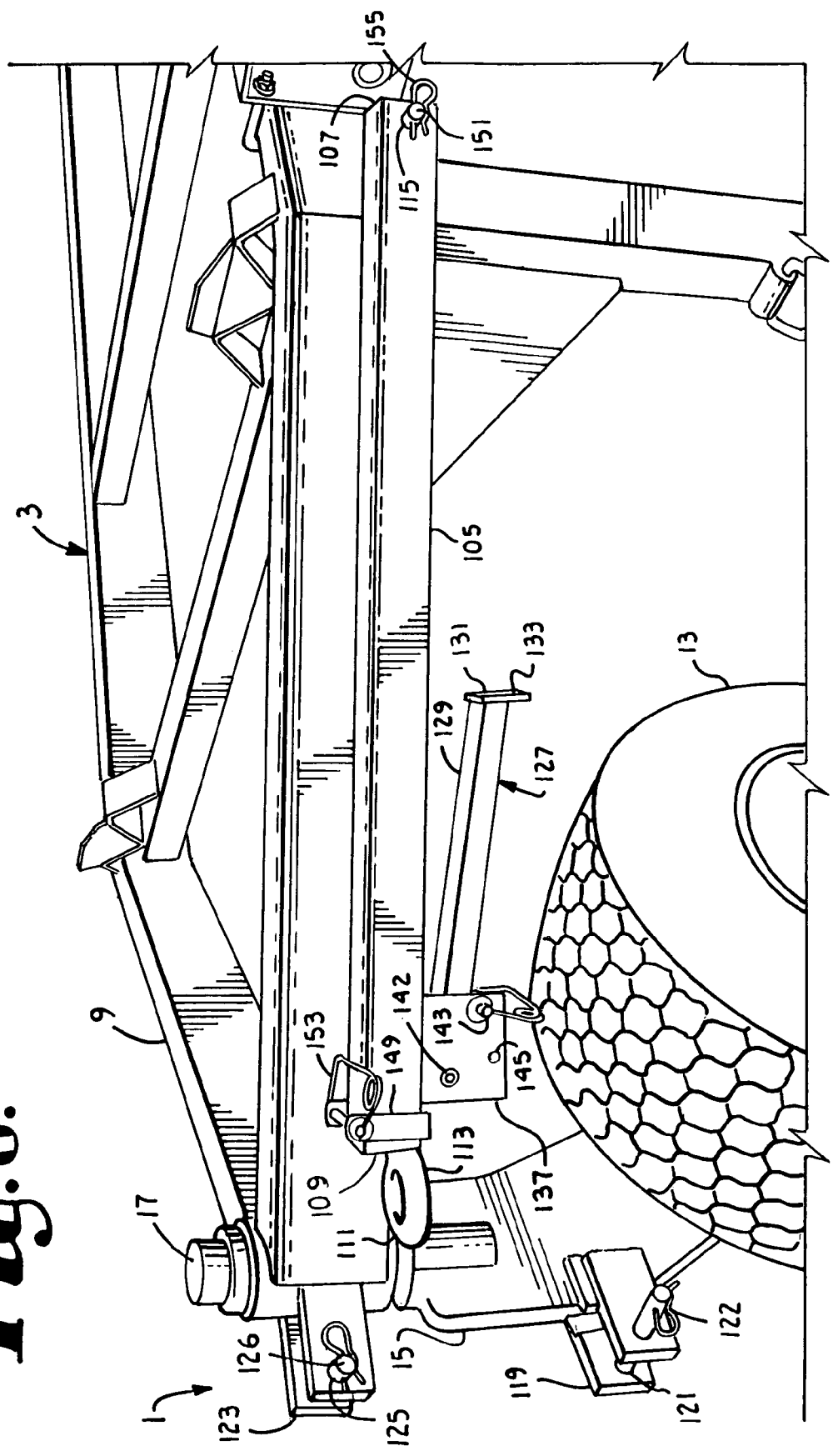

DETACHABLE SIDE MOUNT HITCH SYSTEM FOR AN AGRICULTURAL IMPLEMENT

BACKGROUND OF THE INVENTION

1. Field of the Invention

This invention relates to hitch systems for agricultural implements, and more particularly to a hitch system for releasably mounting an agricultural implement (such as a sod harvester or the like) alongside a towing vehicle for field use and further includes a towing hitch for pulling the implement behind the towing vehicle for transport.

2. Description of the Related Art

In the sod harvesting industry, machines called sod harvesters are used to cut strips of sod loose from the ground. These machines also process the sod into rolls or slabs which are easily transported and installed. The motive force for most sod harvesters is provided by a farm tractor or other similar towing vehicle. Two common configurations for sod harvesters are tow-behind and side mounted harvesters. A tow-behind sod harvester is self supported on its own wheels and is pulled behind the tractor using a standard trailer hitch. A tow-behind sod harvester is disclosed by U.S. Pat. No. Re. 34,827, entitled Method of and Apparatus for Cutting Sod Which Rolls in a Semi-Flaccid Sheet into Sod Roll and commonly owned with the present application.

Prior art side mounted sod harvesters are more or less permanently mounted to a side of the tractor such that at least the cutting head of the machine is positioned alongside the tractor. The weight of the machine is either fully or partially supported by the tractor. The side-mounted machines have certain advantages because the tractor does not run over the sod prior to it being cut and because the machine is positioned in a location where the operator has a clear view of its operation from the tractor seat. Side mounted sod harvesters, however, have significant disadvantages when it comes to transportation of the machines since they are generally too wide to travel down public roads or to fit through gates or other narrow openings. Furthermore, conventional side mounted sod harvesters tie up the tractor and prevent it from being used for other purposes.

What is needed is a hitch system which allows a self supported sod harvester (similar to existing tow-behind machines), or any similar agricultural implement, to be releasably mounted alongside a towing vehicle for use in the field while also allowing it to be pulled behind the towing vehicle for transport.

SUMMARY OF THE INVENTION

The present invention is a hitch system which includes a side mount hitch for releasably attaching an agricultural implement to a towing vehicle. The side mount hitch generally comprises a pair of longitudinally spaced and upwardly oriented hitch balls connected to a side of the towing vehicle and a pair of longitudinally spaced hitch arms pivotally connected to an adjoining side of the implement. Each arm is equipped with a hitch coupler mounted proximate its distal end. The hitch couplers are each adapted to engage a respective one of the hitch balls on the towing vehicle. The arms are each equipped with a linear actuator adapted to move the arm between a raised transport position and a lowered and laterally extending working position wherein the couplers engage the hitch balls.

The hitch system may also include a towing hitch for connecting the implement behind the towing vehicle for transport. The towing hitch is designed for an agricultural implement having a frame and a front dolly wheel assembly including a wheel carrier rotatably connected to the frame and at least one wheel rotatably connected to the wheel carrier. The towing hitch comprises a tongue having proximate and distal ends wherein the distal end includes hitch means (such as a pintle ring, ball hitch coupler or clevis) for connecting said tongue to the towing vehicle, and the proximate end is releasably connected to the wheel carrier of the dolly wheel assembly. In order to prevent the tongue for jackknifing during backing maneuvers, the towing hitch may also include means for alternatively connecting the proximate end of the tongue to the implement frame. For example, the proximate end of the tongue may be releasably connected to the wheel carrier through a first clevis connected to the wheel carrier and alternatively connectable to the implement frame through a second clevis mounted on the implement frame.

BRIEF DESCRIPTION OF THE DRAWINGS

FIG. 3 is a side view of the implement showing the mounting of a pair of hitch arms which also form a part of the hitch system.

FIG. 4 is a fragmentary side view of the implement showing a towing hitch which forms a part of the hitch system in a hook-up configuration.

FIG. 5 is a view similar to FIG. 4 showing the towing hitch in a backing configuration.

FIG. 6 is a fragmentary perspective view of the implement showing the towing hitch in a storage configuration.

DETAILED DESCRIPTION OF THE PREFERRED EMBODIMENTS

Figure 1:
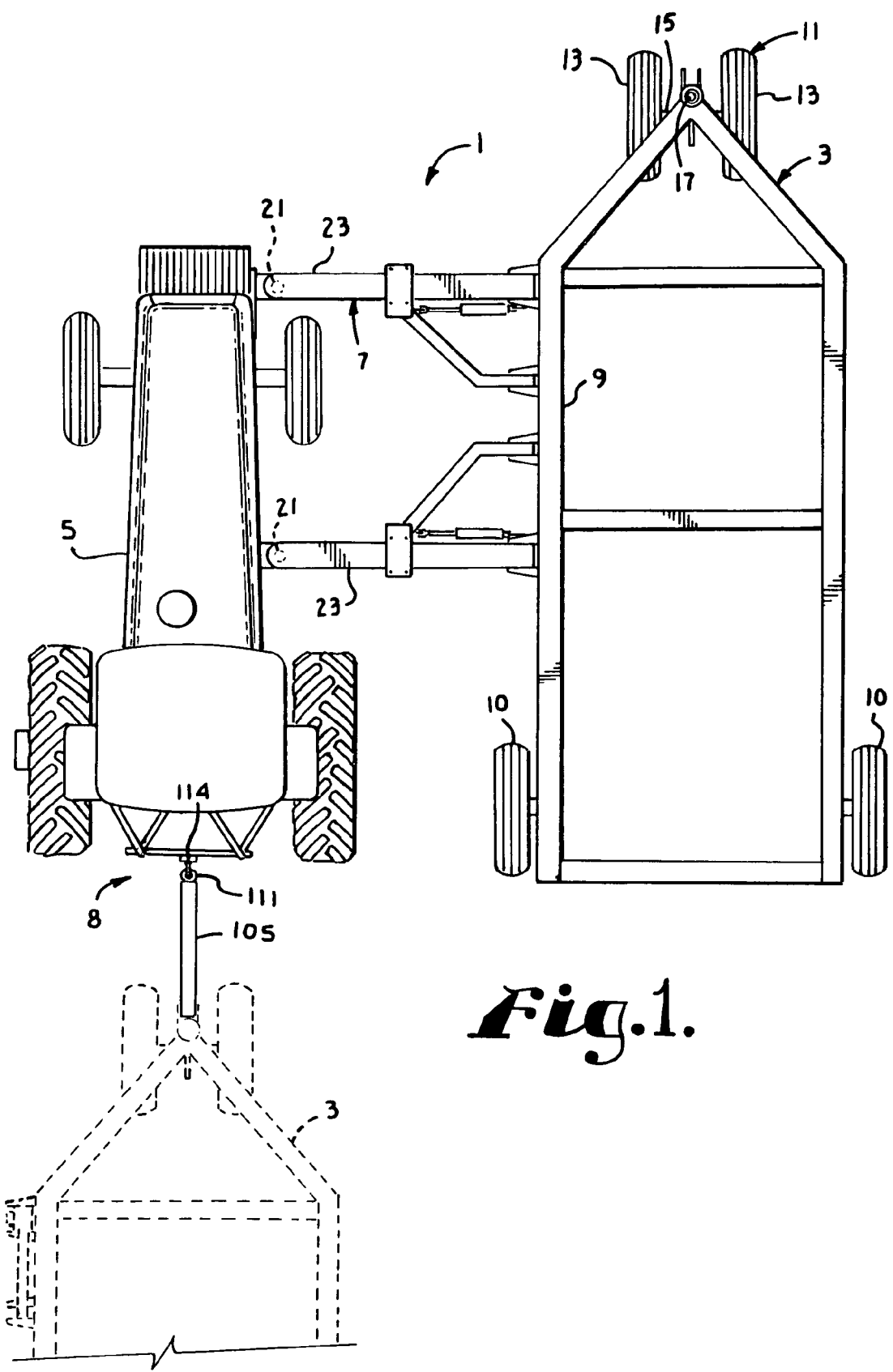
FIG. 1 is a partially schematic plan view showing a hitch system according to the present invention used to attach an implement alongside a towing vehicle.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 generally designates a hitch system according to the present invention. The hitch system 1 is used to releasably attach an agricultural implement 3 alongside a towing vehicle 5 (which will be described and depicted herein as a conventional farm tractor) for use in the field, and further allows the implement 3 to be towed behind the towing vehicle 5 for road transport. The hitch system 1 generally includes a side hitch 7 and a towing hitch 8.

The implement 3 may be, for example, a sod harvester generally as described in U.S. Pat. Re 34,827 mounted on a frame 9 and having a pair of laterally spaced rear wheels 10 and a front dolly wheel assembly 11. The dolly wheel assembly 11 includes at least one front wheel 13 (two shown) rotatably mounted to a wheel carrier 15. The carrier 15 is, in turn, pivotally mounted to the frame 9 so as to be freely rotatable about a generally vertical pivot 17. The implement 3 is self-supported on wheels 10 and 13.

The side hitch 7 includes a pair of longitudinally spaced hitch balls 21 mounted on a side of the tractor 5 and a pair of hitch arms 23 mounted on a corresponding side of the implement frame 9. The arms 23 are pivotable about a generally horizontal axis and carry hitch couplers 25 which are engageable with the hitch balls 21.

Figure 2:
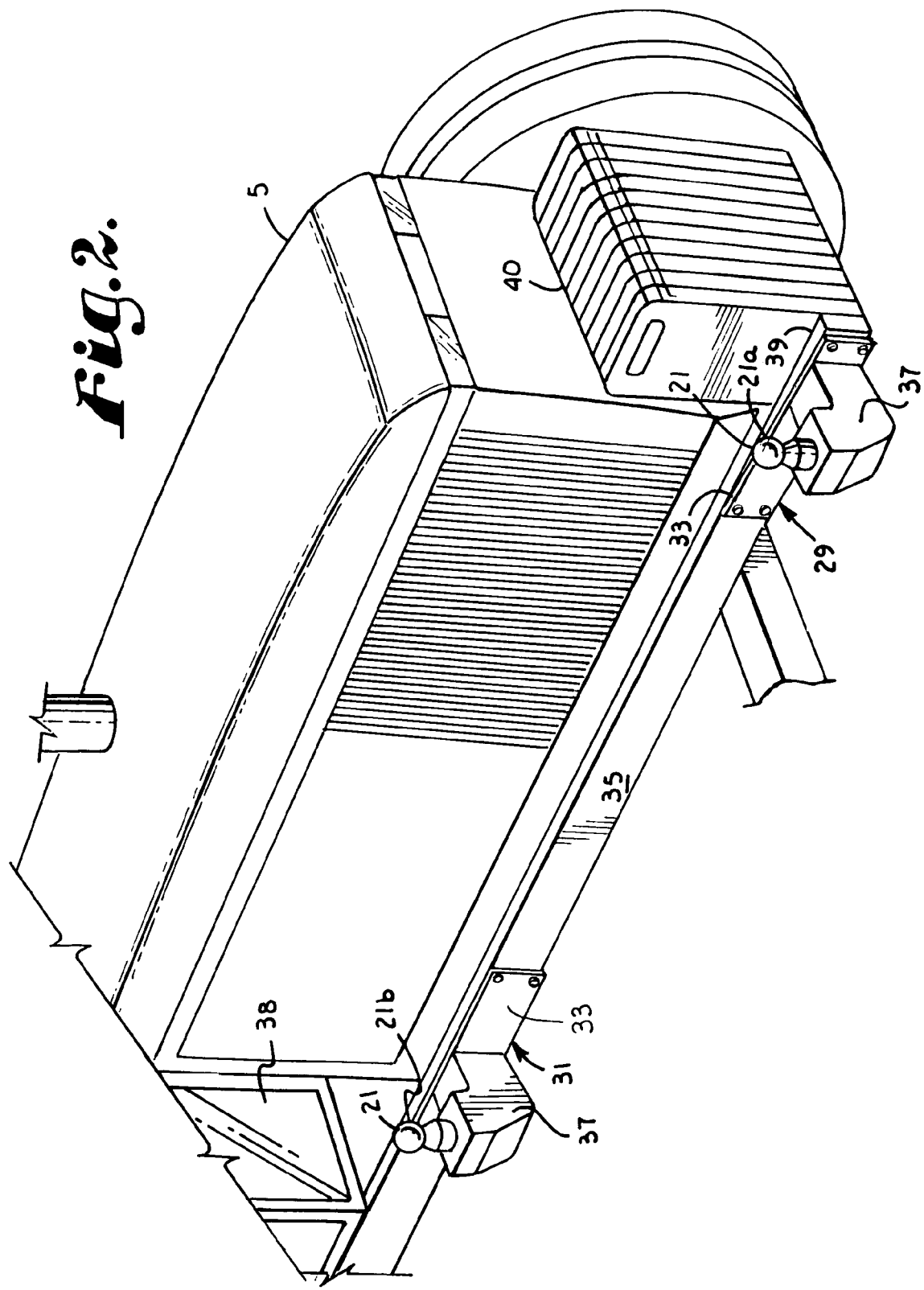
FIG. 2 is a perspective view of the towing vehicle showing the mounting of a pair of hitch balls which form a part of the hitch system.

Referring to FIG. 2, the hitch balls 21 include a forward hitch ball 21a and a rearward hitch ball 21b which are attached to the tractor 5 by respective brackets 29 and 31. Each of the brackets 29 and 31 comprises a backing plate 33 adapted to be bolted or otherwise secured to a side frame member 35 of the tractor 5 and an outwardly extending perch 37 which supports the respective hitch ball 21 in an upwardly oriented position. The forward hitch ball 21a and its bracket 29 are preferably fastened to the tractor 5 proximate the front of the tractor 5 while the rearward hitch ball 21b and its bracket 31 are mounted just forward of the tractor cab 38 or operator's station. An extension 39 may be used to space the forward hitch ball 21a forward of the end of the side frame member 35, such as alongside the tractor's weight rack 40. If the tractor frame tapers inwardly toward the front of the tractor, the extension 39 may also be wedge shaped to space the forward hitch ball 21a outwardly and into longitudinal alignment with the rearward hitch ball 21b.

Referring to FIG. 3, the arms 23 include a forward arm 23a and a rearward arm 23b, each of which comprises a steel box beam and has a proximate end 41, a distal end 43, an upper surface 45 and a lower surface 47. The arms 23 are connected to the implement 5 through a transverse tubular pin receiver 49 welded to the proximate end 41 of each arm 23. The pin receivers 49 are received between respective pairs of vertical flanges 51 which extend outwardly from respective arm attaching brackets 53 mounted on the implement frame 9. Each flange 51 has a pin receiver 55 formed therethrough. A respective clevis pin 57 is simultaneously received through each tubular pin receiver 49 and the receivers 55 in the respective pair of flanges 51.

Each arm 23 is reinforced by an outrigger 59 which is similarly formed of steel box beam and includes a hinge portion 61 which is oriented parallel to the respective arm 23 and a connecting portion 63 which lies at an oblique angle to both the respective arm 23 and to the respective hinge portion 61. Each hinge portion 61 has a proximate end 65 with a transverse tubular pin receiver 67 welded thereto. The pin receivers 67 are received between respective pairs of vertical flanges 69 which extend outwardly from respective outrigger brackets 71 mounted on the implement frame 9. Each flange 69 has a pin receiver 73 formed therethrough. A respective clevis pin 75 is simultaneously received through each tubular pin receiver 67 and the receivers 73 in the respective pair of flanges 69. The connecting portions 63 of the outriggers 59 each include a distal end 77 which is welded or otherwise connected to a tie plate 79. The tie plates 79 are, in turn, each connected to the respective arm 23, such as by U-bolts 81. The outrigger 59 connected to the forward arm 23a extends rearwardly from the arm 23a whereas the outrigger 59 connected to the rearward arm 23b extends forwardly from the arm 23b.

The hitch couplers 25 are each mounted on the lower surface 47 of a respective arm 23 proximate its distal end 43. The couplers 25 are sized to matingly receive the hitch balls 21 mounted on the tractor 5. The couplers 25 may be self-latching or include pins 83 receivable through openings 85 in the couplers 25 for latching the couplers to the hitch balls 21.

Each of the arms 23 is equipped with a respective double acting hydraulic cylinder 87 or other linear actuator capable of moving the respective arm 23 between a lowered an laterally extending working position and a raised transport position. Each cylinder 87 has opposed ends 89 and 91. One of the ends 89 or 91 of each cylinder 87 is connected to a lower lug 93 extending outwardly from the bracket 53 securing the respective arm 23 to the implement 3. The other end 89 or 91 of each cylinder 87 is connected to an upper lug 95 which extends outwardly from the respective tie plate 79. Hydraulic hoses 97 and 99 connect each cylinder 87 to a hydraulic system of the implement 3 or tractor 5. While the implement 3 is in use, the hydraulic system may be adjusted to allow the cylinders 87 to "float" or allow relative movement between the implement 3 and tractor 5 to adjust to the terrain.

The arms 23 are preferably selectively longitudinally moveable relative to the implement 3 so that the arms 23 may be aligned with the placement of the hitch balls 21 on the tractor 5. For example, if the implement frame 9 includes an elongate tubular member 101, the brackets 53 and 71 may be secured to the tubular member 101 using U-bolts 103. The U-bolts 103 may be loosened to allow the arms 23 to be repositioned longitudinally along the tubular member 101 and then tightened to secure the arms 23 in the selected position.

Referring to FIG. 4, the towing hitch 8 is used for towing the implement 3 behind the towing vehicle 5, for example while transporting the implement 3 along roads or between fields. The towing hitch 8 includes a removable tongue 105 having a proximate end 107 and a distal end 109. The distal end 109 includes hitch means 111 for connecting the distal end 109 to the rear of the towing vehicle 5. The hitch means 111 is pictured as a pintle loop 113 receivable by a conventional pintle hook 114 (see FIG. 1) mounted on the rear of the towing vehicle 5. It is to be understood, however, that the hitch means 111 could also comprise a ball coupler, clevis hitch, or other known hitch means. The proximate end 107 of the tongue 105 includes a horizontal pin receiver 115. A first clevis 119 mounted on a forward facing surface of the dolly wheel carrier 15 of the implement 3 includes horizontal pin receivers 121. The tongue 105 is releasably attached to the implement 3 by inserting a clevis pin 122 simultaneously through the pin receivers 115 and 121.

The implement 3 is easily towed behind the towing vehicle 5 with the tongue 105 connected to the wheel carrier 15 as described, however it has been found that backing the implement, such as into a storage building, may be difficult in this configuration because the tongue 105 tends to jack-knife when the wheel carrier 15 unexpectedly pivots about its vertical pivot 17. In order to make backing easier, the towing hitch may include a second clevis 123 mounted on a forward facing surface of the implement frame 9. The second clevis 123 includes horizontal pin receivers 125.

When it is desired to back up the implement 3, the tongue 105 may be releasably attached to the implement 3 as shown in FIG. 5 by inserting the clevis pin 122 (or an identical pin 126) simultaneously through the pin receivers 115 and 125.

The task of hooking the tongue 105 to the towing vehicle 5 is made easier by an optional tongue support stand 127 which allows for one-person hitching. The stand 127 includes an elongate leg 129 have a lower end 131 with a foot 133 attached thereto. The leg 129 further includes an upper end 135 which is pivotally attached to the tongue 105 by a bracket 137. The bracket 137 is mounted to the underside of the tongue 105 proximate its distal end 109 and generally includes a pair of longitudinal side flanges 139 and a transverse front plate 141 welded between the side flanges 139. The side flanges 139 are spaced apart to receive the leg 129 therebetween. The leg 129 is attached to the flanges 139 by a pivot pin 142 which passes through aligned holes in the leg 129 and flanges 139. The leg 129 is moveable between a lowered tongue supporting position and a raised traveling position. In the tongue supporting position (see FIG. 4), the leg 129 is in abutting relation with the front plate 141 and is retained in position by a lock pin 143 which is inserted through aligned openings 145 in the side flanges 139 behind the leg 129. When the leg 129 is in the raised position (see FIG. 5), the foot 133 is in close proximity to the tongue 105. The leg 129 is retained in the raised position by inserting the lock pin 143 through aligned openings 147 in the side flanges 139 below the leg 129.

When the tongue 105 is not in use, it may be attached to the implement frame 9 for storage as shown in FIG. 6. A U-shaped bracket 149 and a pin 151 extending outwardly from the frame 9 are provided for this purpose. When the tongue 105 is stored, pin 151 extends through the pin receiver 115 in the proximate end 107 of the tongue 105 and bracket 149 receives a portion of the tongue 105 near the distal end 109. Retaining pins 153 and 155 extend through openings in the bracket 149 and pin 151, respectively, to retain the tongue 105 in place.

In use, the implement 3 is towed into a field behind a towing vehicle 5 using the towing hitch 8. The tongue 105 is then disconnected from both the towing vehicle 5 and the wheel carrier 15 and stored on the implement frame 9. The towing vehicle is then pulled alongside and parallel to the implement 3 such that the hitch balls 21 are aligned with the respective arms 23. The hydraulic cylinders 87 are then activated to lower the arms 23 into the working position and bring the couplers 25 into engagement with the hitch balls 21. If the couplers 25 are not self latching, pins 83 may be inserted through openings 85 in the couplers 25 to secure the couplers to the hitch balls 21.

When it is desired to disconnect the implement 3 for transport, the couplers 25 are first unlatched, such as by removing the pins 83. The hydraulic cylinders 87 are then activated to raise the arms 23 into the transport position. The tongue 105 is then removed from the implement frame 9 and connected to the wheel carrier 15 by inserting the clevis pin 120 through the pin receiver 115 in the tongue 105 and the pin receivers 121 in the first clevis 119. The tongue 105 may be supported on the tongue support stand 127 by removing the lock pin 143 from the openings 147 in the side flanges 139 and lowering the leg 129 into the tongue supporting position. The leg 129 is retained in position by inserting the lock pin 143 through the openings 145 in the side flanges 139 behind the leg 129. The towing vehicle 5 can then be moved around to the front of the implement 3 and the hitch means 111 connected to the rear of the towing vehicle 5. The leg 129 is then moved into the raised position and the lock pin 143 inserted through the openings 147 in the side flanges 139 below the leg 129. The implement 3 may then be towed to the next field or to a storage area.

If it is necessary to back up the implement 3, for example to move it into a machine shed or storage area, the tongue 105 may be disconnected from the first clevis 119 on the wheel carrier 25 and connected to the second clevis 123 on the implement frame 9 by inserting the clevis pin 120 or 126 through the pin receivers 115 and 125. This procedure will prevent the tongue 105 from jackknifing during backing.

It is to be understood that while certain forms of the present invention have been illustrated and described herein, it is not to be limited to the specific forms or arrangement of parts described and shown. For example, it is to be understood that the towing vehicle used in combination with the towing hitch 8 to transport the implement 3 need not be the same towing vehicle or tractor 5 used in combination with the side hitch 7 to pull the implement 3 in the field. It is also to be understood that the implement 3 on which the hitching system 1 can be used need not be limited to sod harvesters, as the hitching system 1 may be easily adapted to other implements 3 such as specialized vegetable harvesters, forage harvesters and balers, etc. The towing hitch 8, in particular, may be applicable to a wide variety of tow behind implements 3 such has hay rakes and the like.

It is further to be understood that hitch balls 21 on the towing vehicle 5 and couplers 25 on the arms 23 are not the only coupling means which could be used to couple the distal ends 43 of the arms 23 to the towing vehicle 5. For example, it is foreseen that the hitch balls 21 could be on the arms 23 and that the couplers 25 could be mounted on the towing vehicle 5. It is also foreseen that other types of coupling means such as pintle hooks and loops, pins and receivers with spherical ball joints, and any of a variety of known coupling means could also be used. It is likewise foreseen that the arms 23 could be pivotally connected to the towing vehicle 5 instead of the implement 3 and selectively engage coupling means on the implement 3.

What is claimed is:

1. A hitch system for attaching an agricultural implement alongside a towing vehicle, said implement and said towing vehicle each having a front end, a rear end and opposed sides extending longitudinally between said front and rear ends, said hitch system comprising:
    a) a pair of longitudinally spaced hitch arms, each said arm having a proximate end and a distal end, each said proximate end being pivotally connected to one of the implement or the towing vehicle on one of said sides adjacent to the other of the implement or the towing vehicle;
    b) respective first coupling means mounted on the distal end of each of said arms for selectively engaging respective second coupling means on said other of the implement or the towing vehicle; wherein
    c) said arms are moveable between a raised and substantially vertically extending transport position and a lowered and laterally extending working position wherein said first coupling means are engaged with said second coupling means; and further including
    d) a respective linear actuator connected to each said arm for moving said arms between said transport position and said working position.

2. The hitch system as in claim 1 and further including a respective outrigger reinforcing each said arm; each said outrigger being fixedly connected to its respective arm and pivotally connected to said one of the implement or the towing vehicle.

3. The hitch system as in claim 1 wherein said arms are selectively longitudinally movable relative to said one of the implement or the towing vehicle.

4. The hitch system as in claim 1 and further including a towing hitch for alternatively attaching the implement behind the towing vehicle.

5. A hitch system for attaching an agricultural implement alongside a tractor having a tractor frame and an operator's station, said implement and said tractor each having a front end, a rear end and opposed sides extending longitudinally between said front and rear ends, said hitch system comprising:
   a) a pair of longitudinally spaced hitch arms, each said arm having a proximate end and a distal end, each said proximate end being pivotally connected to the implement on one of said sides thereof;
   b) a pair of ball couplers each mounted on the distal end of one of said arms for selectively engaging a respective one of a pair of hitch balls on the tractor; said hitch balls include a forward hitch ball secured to the tractor frame proximate a front extremity thereof and a rearward hitch ball secured to the tractor frame just forward of the operator's station; and wherein
   c) said arms are moveable between a raised and substantially vertically extending transport position and a lowered and laterally extending working position wherein said ball couplers are engaged with said hitch balls.

6. The hitch system as in claim 5 wherein said hitch balls are secured to the tractor frame by respective mounting brackets, each said mounting bracket including a backing plate adapted to be bolted to the tractor frame and a perch extending outwardly from said backing plate and supporting the respective hitch ball.

7. The hitch system as in claim 6 wherein the tractor frame tapers inwardly toward the front extremity thereof and said hitch system further includes a spacer interposed between the one of said mounting brackets supporting said forward hitch ball and the tractor frame, said spacer positioning said forward hitch ball in longitudinal alignment with said rearward hitch ball.

8. A hitch system for attaching an agricultural implement having a frame and a front dolly wheel assembly including a wheel carrier rotatably connected to the frame to a towing vehicle, said hitch system comprising:
   a) a pair of longitudinally spaced hitch arms, each said arm having a proximate end and a distal end, each said proximate end being pivotally connected to one of the implement or the towing vehicle on a side adjacent to the other of the implement or the towing vehicle;
   b) respective first coupling means mounted on the distal end of each of said arms for selectively engaging respective second coupling means on said other of the implement or the towing vehicle; and
   c) a towing hitch for alternatively attaching the implement behind the towing, said towing hitch comprising:
      i) a tongue having proximate and distal ends, said proximate end being pivotally connected to the wheel carrier of the dolly wheel assembly; and
      ii) hitch means on said distal end of said tongue for coupling said tongue to a rear portion of the towing vehicle.

9. The hitch system as in claim 8 wherein said proximate end of said tongue is removably connected to the wheel carrier and alternatively connectable to the implement frame.

10. The hitch system as in claim 8 wherein said proximate end of said tongue is removably connected to the wheel carrier through a first clevis connected to the wheel carrier and said tongue is alternatively connectable to a second clevis mounted on the implement frame.

11. A hitch system for attaching an agricultural implement alongside a towing vehicle, wherein the implement includes a frame with an elongate longitudinal frame member positioned along a first side of the implement, the hitch system comprising:
   a) a pair of longitudinally spaced and upwardly oriented hitch balls connected to a side of the towing vehicle adjacent the first side of the implement;
   b) a pair of elongate hitch arms, each said arm having a proximate end and a distal end, each said proximate end including a transverse pin receiver;
   c) a pair of arm attaching brackets mounted on the longitudinal frame member and longitudinally spaced therealong, each said bracket having a pair of outwardly extending vertical flanges, each said flange having a pin receiver formed therein;
   d) a pair of clevis pins, each said clevis pin being simultaneously received by the transverse pin receiver in a respective one of said arms and the pin receivers of a respective one of said arm attaching brackets;
   e) a pair of hitch couplers, each said hitch coupler being connected to a respected one of said hitch arms proximate its distal end, said hitch couplers each being adapted to engage a respective one of said hitch balls;
   f) a pair of outriggers, each said outrigger reinforcing a respective one of said arms and including a hinge portion lying generally parallel to the respective arm and a connecting portion interconnecting the respective hinge portion to the respective arm, each said hinge portion having a proximate end including a transverse pin receiver;
   g) a pair of outrigger attaching brackets mounted on the longitudinal frame member and longitudinally spaced therealong, each said bracket having a pair of outwardly extending vertical flanges, each said flange having a pin receiver formed therein;
   h) a pair of clevis pins, each said clevis pin being simultaneously received by the transverse pin receiver in a respective one of said outriggers and the pin receivers of a respective one of said outrigger attaching brackets; and
   i) a pair of linear actuators, each said linear actuator being connected between a respective one of said arms and its respective arm attaching bracket; said actuators acting to move said arms between a raised transport position and a lowered working position wherein the couplers each engage a respective one of said hitch balls on the towing vehicle.

12. The hitch system as in claim 11 wherein said arm attaching brackets and said outrigger attaching brackets are connected to the longitudinal frame member by respective U-bolts such that said arms are selectively longitudinally moveable along the longitudinal frame member.

13. The hitch system as in claim 11 wherein the one of said outriggers connected to the forwardmost of said hitch arms extends rearwardly therefrom and the one of said outriggers connected to the rearwardmost of said hitch arms extends forwardly therefrom.

14. The hitch system as in claim 11 wherein each said outrigger connecting portion is connected to its respective hitch arm by a tie plate, each said tie plate being fixedly connected to the respective connecting portion and connected to the respective hitch arm by at least one U-bolt.

15. The hitch system as in claim 14 wherein each said linear actuator is connected between an upper lug extending outwardly from the respective tie plate and a lower lug extending outwardly from the respective arm attaching bracket.

16. The hitch system as in claim 11 wherein the towing vehicle is a conventional farm tractor having a tractor frame and an operator's station, and said hitch balls include a forward hitch ball secured to the tractor frame proximate a front extremity thereof and a rearward hitch ball secured to the tractor frame just forward of the operator's station.

17. The hitch system as in claim 11 wherein the implement includes a front dolly wheel assembly including a wheel carrier rotatably connected to the frame, said hitch system further including a towing hitch comprising:
   a) a tongue having proximate and distal ends, said proximate end being pivotally connected to the wheel carrier of the dolly wheel assembly; and
   b) hitch means on said distal end of said tongue for coupling said tongue to a rear portion of the towing vehicle.

18. The hitch system as in claim 17 wherein said proximate end of said tongue is removably connected to the wheel carrier and alternatively connectable to the implement frame.

19. The hitch system as in claim 17 wherein said proximate end of said tongue is removably connected to the wheel carrier through a first clevis connected to the wheel carrier and said tongue is alternatively connectable to a second clevis mounted on the implement frame.

20. A hitch system for attaching an agricultural implement to a towing vehicle, said hitch system comprising:
   a) a side hitch for attaching the implement alongside the towing vehicle, comprising:
      i) a pair of longitudinally spaced and upwardly oriented hitch balls connected to a first side of the towing vehicle;
      ii) a pair of longitudinally spaced arms pivotally connected to the implement frame on a side of the implement adjacent to said first side of the towing vehicle, each said arm having a distal end and a hitch coupler connected thereto proximate said distal end; and
      iii) a pair of linear actuators, each said linear actuator being connected between a respective one of said arms and the implement frame; said actuators acting to move said arms between a raised transport position and a lowered working position wherein the couplers each engage a respective one of said hitch balls on the towing vehicle.

21. The hitch system as in claim 20 and further including a towing hitch for alternatively attaching the implement behind the towing vehicle.

22. The hitch system as in claim 21 wherein the implement includes a frame and a front dolly wheel assembly including a wheel carrier rotatably connected to the frame, said towing hitch comprising:
   a) a tongue having proximate and distal ends, said proximate end being pivotally connected to the wheel carrier of the dolly wheel assembly; and
   b) hitch means on said distal end of said tongue for coupling said tongue to a rear portion of the towing vehicle.

23. The hitch system as in claim 22 wherein said proximate end of said tongue is removably connected to the wheel carrier and alternatively connectable to the implement frame.

24. The hitch system as in claim 22 wherein said proximate end of said tongue is removably connected to the wheel carrier through a first clevis connected to the wheel carrier and said tongue is alternatively connectable to a second clevis mounted on the implement frame.

25. The hitch system as in claim 22 and further including a tongue support stand pivotally connected to said tongue proximate said distal end of said tongue, said tongue support stand being moveable between a lowered, tongue supporting position and a raised storage position.

* * * * *